United States Patent
Müller

[19]
[11] Patent Number: 6,004,087
[45] Date of Patent: Dec. 21, 1999

[54] SELF-ATTACHING FASTENER

[75] Inventor: Rudolf R. M. Müller, Frankfurt, Germany

[73] Assignee: Profil-Verbindungstechnik GmbH & Co. KG, Germany

[21] Appl. No.: 08/996,178

[22] Filed: Dec. 22, 1997

Related U.S. Application Data

[62] Division of application No. 08/698,870, Aug. 16, 1996.

[30] Foreign Application Priority Data

Aug. 18, 1995 [DE] Germany ............................. 19530466

[51] Int. Cl.$^6$ ............................. F16B 37/04; F16B 37/00
[52] U.S. Cl. ......................... 411/180; 411/107; 411/427
[58] Field of Search ................................. 411/107, 179, 411/180, 181, 183, 427

[56] References Cited

U.S. PATENT DOCUMENTS

| | | |
|---|---|---|
| 3,253,631 | 5/1966 | Reusser . |
| 3,282,315 | 11/1966 | Zahodiakin . |
| 3,282,317 | 11/1966 | Zahodiakin . |
| 3,299,500 | 1/1967 | Double . |
| 3,724,520 | 4/1973 | Ladouceur et al. . |
| 3,810,291 | 5/1974 | Ladouceur . |
| 3,926,236 | 12/1975 | Pouch et al. . |
| 3,985,172 | 10/1976 | Ballantyne ............................. 411/179 |
| 4,708,556 | 11/1987 | Pamer et al. . |
| 5,340,251 | 8/1994 | Takahashi et al. ................... 411/180 X |
| 5,531,552 | 7/1996 | Takahashi et al. . |
| 5,549,430 | 8/1996 | Takahashi et al. . |

FOREIGN PATENT DOCUMENTS

| | | |
|---|---|---|
| 22 27 039 | 12/1972 | Germany . |
| 24 41 977 A1 | 3/1975 | Germany . |
| 22 29 499 C3 | 7/1976 | Germany . |
| 30 19 070 A1 | 5/1981 | Germany . |
| 33 14 487 A1 | 11/1983 | Germany . |
| 24 41 977 C2 | 4/1985 | Germany . |
| 35 24 306 A1 | 1/1986 | Germany . |

*Primary Examiner*—Neill Wilson
*Attorney, Agent, or Firm*—Howard & Howard

[57] ABSTRACT

A fastener, for example a nut element, for attachment to a plate-like component with an end face of the fastener having a recess within a raised contact surface and a plurality of projections and undercuts are provided in a sidewall of the recess. The base surface of the recess extends up to the bore of the fastener without the presence of a pilot portion and a plurality of recesses are provided in the contact surface for resisting rotation. The die button which serves for the attachment of the fastener to a plate-like component has a hole-forming punch projection which has a plurality of noses distributed around the periphery in the region of the transition to the planar surface of the die button. On attachment of the hollow element to a plate-like component in a press, the sheet metal part is perforated by a hole punch and is molded in form-locked manner by the die button, in particular by its hole-forming punch projection, into the recess of the hollow element. The connection as generated is particularly suitable for sheet metal parts which are subjected to changing loads in operation, and has a high resistance to twist-out and push-out.

9 Claims, 7 Drawing Sheets

SELF-ATTACHING FASTENER

This is a divisional of copending application Ser. No. 08/698,870 filed on Aug. 16, 1996.

BACKGROUND

The present invention relates to a pilot-less fastener, a die button for use with the fastener, a method of attaching the fastener to a plate-like component, and the assembly which results after carrying out the method.

Fasteners of the general type having a hollow body or bore, such as for example internally threaded nuts are known from EP-A-0 553 822 A1 or from the corresponding U.S. Pat. No. 5,340,251. Similar elements having hollow bodies are moreover known from U.S. Pat. No. 3,234,987, from U.S. Pat. No. 3,648,747 or from U.S. Pat. No. 3,253,631.

All these known embodiments have a so-called pilot portion, that is to say that the recess at the end face projecting toward the panel or part is restricted at the radially inner side by a projecting cylindrical pilot portion which extends at least substantially up to the end face.

Such fasteners are typically nut elements; however, for example they could have a cylindrical bore for receiving a spigot or the like. These fasteners offer relatively high security against rotation so that on screwing in a bolt element the fasteners remain firmly anchored to the component, and moreover have a relatively high resistance to push-out.

It has however been found that in operation with changing loads the fasteners sometimes tear out of the plate-like component which is normally made of sheet metal. Moreover the manufacture of such elements or fasteners having hollow bodies is relatively costly and a problem exists that the contact surface is frequently not adequate. Furthermore, the radial dimensions of the part engaging surface of the fastener make it necessary to use a relatively large washer at the bolt side in order to transmit the forces in the desired manner.

The undercut in the sidewall of the recess which is necessary to generate the required press-out resistance of the hollow body is normally generated in such a way that the hollow element is subjected to a squeezing process at the outer peripheral jacket with the sidewall of the recess being brought from an initially axial parallel position into an inclined position. This results in the opening to the recess between the pilot part and the now inclined sidewall to be smaller in comparison to the base surface of the recess. Additionally, as a result of this squeezing movement, the hollow element also has an inclined surface at the outer jacket surface adjacent to the end face engaging the component. On attachment to the plate-like component, the wedge-shaped contact surface, facing the plate-like component, is frequently so deformed that it acts in a knife-like manner under load and a high surface pressure results between the component and the hollow element.

As a result of this high surface pressure the plate-like component yields after a few operating hours and no longer sits as tightly as designed, so that the danger of settlement and of reduction of the preload to zero exists, and thus the danger of failure of the threaded connection.

SUMMARY OF THE INVENTION

The present invention is based on the object of providing a fastener which can be manufactured economically and ensures good security against twist-out, a reliable seat after attachment to the plate-like component, and retains a firm seat even with changing loads without being torn out of the plate-like component and without loosening the bolt element that is used. Another advantage is that the contact surface can be smaller in diameter in comparison to prior solutions but nevertheless of adequate size area-wise so that an undesired high surface pressure does not arise at the plate-like component.

In order to satisfy this object, provision is made in accordance with the invention for the base surface of the recess to extend up to the passage of the bore at least substantially without a pilot portion.

The pilot portion which played a central role with the previously mentioned nut elements during the deformation of the plate-like component into the recess is omitted. In this way, the radial dimensions of the nut element can be reduced approximately by the wall thickness dimensions of the customary pilot parts, whereby the inner diameter of the contact surface is made substantially smaller. This however also offers the possibility of dimensioning the outer diameter of the contact surface in comparison to the inner diameter in such a way that the radial width of the contact surface is larger. In this way an enlarged ring surface is present in comparison to the known hollow elements and the surface pressure can be reduced in operation. As a result of the changed dimensions the necessity of using a washer at the bolt side can be avoided.

In order to use this element with a hollow body a modification of the die button and of the setting head is necessary to satisfy the functions previously satisfied by the pilot portion. In the prior art the pilot portion serves on the one hand as a hole punch in order to punch out a slug from the sheet metal part in cooperation with a die button. This punching function is now achieved by means of a hole punch which is coaxially guided in the setting head relative to the hollow element and which, during the closing movement of the setting head, moves through the bore of the hollow element and in cooperation with the die button, serves to punch out a slug.

A hole punch of this kind is known, for example from the German patent 34 46 978 or from DE-OS 38 35 566.3; however, the hole punch is used there with a differently shaped hollow element which, so to say, also has a pilot portion in the form of a so-called rivetting section. Accordingly the use of a hole punch with a nut element without a pilot portion is not believed to be obvious.

Another function of the pilot portion in the hollow element of the prior art lies in forming the metal of the sheet metal component into the undercut in order to generate the security against push-out and additionally also the security against twist-out. This function is also taken on by the die button of the present invention and solved differently than before.

To generate the security against twist-out for the hollow element of the present invention, a number of recesses are pressed into the contact surface. The die button for the insertion of the nut element has a plurality of noses which ensure that the material of the plate-like component is pressed onto at least one of the recesses and preferably into a plurality of the recesses and generates a resistance against rotation. By way of example eight recesses can be provided in the contact surfaces and six noses on the die button whereby, independently of the respective rotational position of the fastener at least one of the noses lies opposite a recess.

Through the use of recesses in the contact surface, undercuts are formed at the sidewall of the recess in the hollow element simultaneously with the forming of the recesses by pressing and indeed in the form of local bead-like deformations of the sidewall. During the attachment process the sheet metal is pressed into the so formed undercuts which additionally ensures the required resistance to push-out and on the other hand however also forms an additional resistance against rotation.

Since the undercuts arise during the formation of the recesses in the contact surface of the hollow element, and do not have to be generated by a squeezing movement at the jacket surface of the hollow element, the hollow element lacks the pronounced chamfer which arises with hollow elements in accordance with the initially named EP-A-0 553 822. This is however of advantage because it is then possible to form the transition from the contact surface into the jacket surface of the hollow element with only a small radius, for example of less than 0.5 mm, whereby the available surface of the contact surface is increased in comparison to the prior art.

The invention will be explained in more detail in the following with reference to embodiments having regard to the drawings in which are shown:

FIG. 1 is a plan view on the end face of an element having a hollow body in accordance with the invention, with only one half of the hollow element being shown, FIG. 2 is a partly sectioned sideview of the hollow element of the invention in accordance with FIG. 1, FIG. 3 is a schematic illustration of the first phase of a method of the invention for attachment of the hollow element of FIGS. 1 and 2 to a plate-like component, FIG. 4 is a later phase of the method of the invention shortly before the perforation of the plate-like component, FIG. 5 is a later phase of the method of the invention immediately after the perforation of the plate-like component, FIG. 6 is a still later phase of the method of the invention during the deformation of the plate-like component, FIGS. 7, and 7A are the end of the method of the invention after the attachment of the hollow element to the plate-like component, with FIG. 7A showing the arrangement of the die button in the lower tool, FIG. 8 is a partly sectioned sideview of the assembly consisting of the hollow element of the invention and a sheet metal part, FIG. 9 is a somewhat modified embodiment of the hollow element of FIG. 1 in an illustration corresponding to that of FIG. 2, FIG. 10 is a further modification of the hollow element of FIG. 1, likewise in a representation in accordance with FIG. 2, FIG. 11 is a plan view of the contact surface of the hollow element of FIG. 10, and FIG. 12 is a further illustration of a further embodiment of the hollow element of FIG. 1, again in an illustration in accordance with FIG. 2.

DETAILED DESCRIPTION OF THE INVENTION

Figure 1:
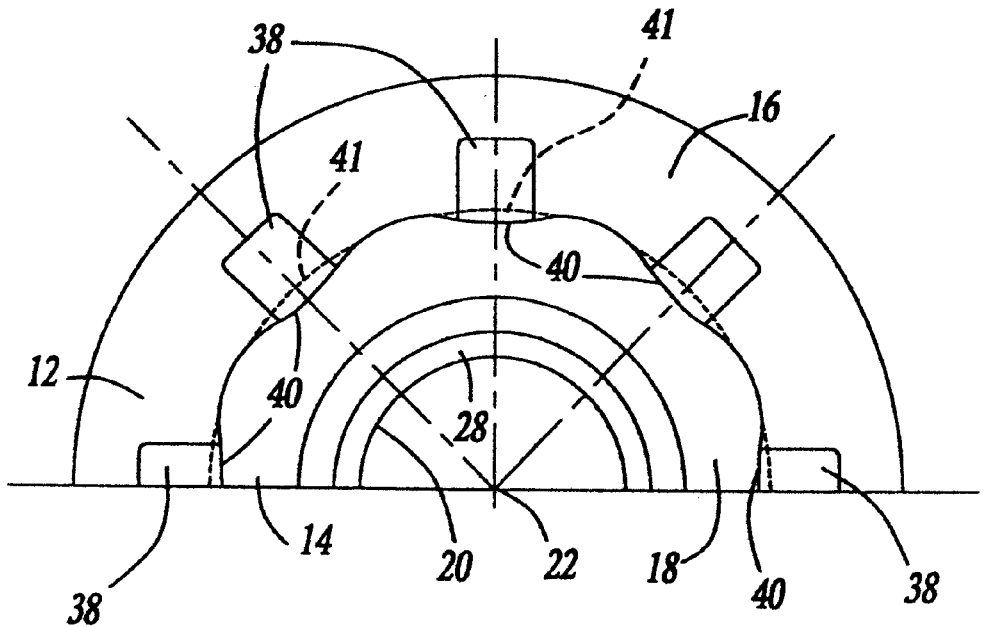
Figure 2:
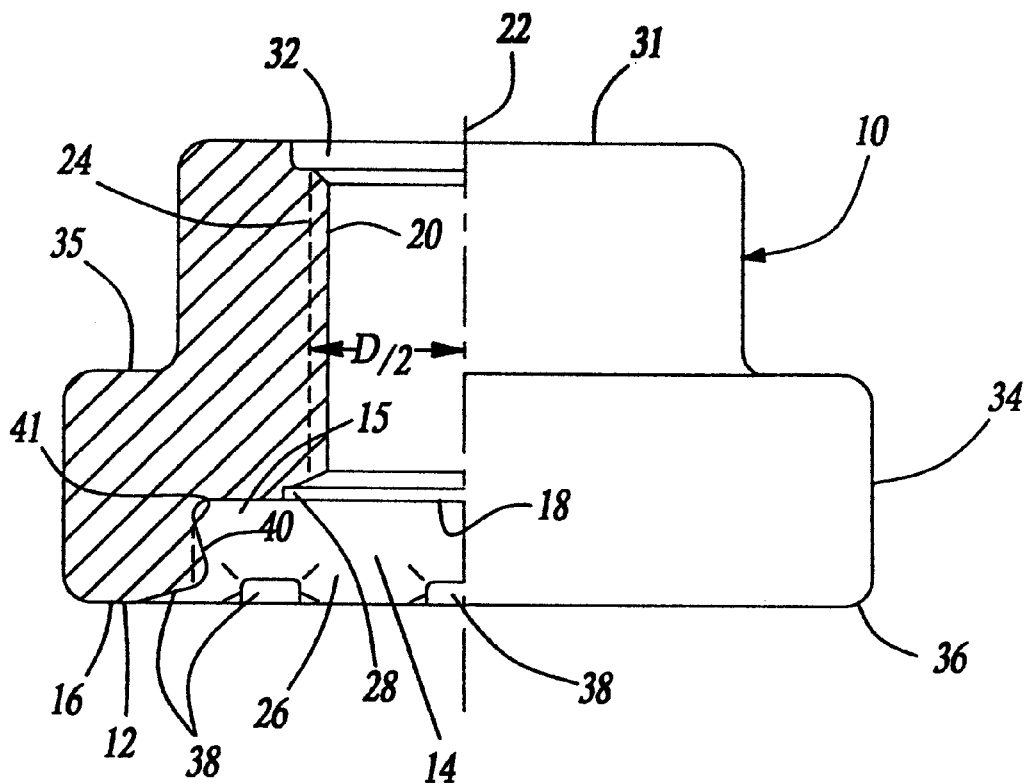

As seen in FIGS. 1 and 2, the hollow element or fastener 10 consists of an essentially cylindrical body of metal with an end face 12 which, after attachment of the element to a plate-like component, faces the plate-like component. The end face 12 has a recess 14 which is arranged within a raised contact surface 16, with the base surface 18 of the recess extending up to the bore 20 of the hollow element 10. The bore 20 has a central axis 22 which at the same time represents the longitudinal axis of the hollow element and is formed as a threaded bore with a thread 24, so that the hollow element shown is a nut element.

The base surface 18 of the recess 14 merges via a shoulder 26 into a surface 28, with the outer diameter of the surface 28 being fractionally larger than the outer diameter D of the thread 24 provided in the bore 20. One notes that the bore 20 or the thread 24, the surface 28, the shoulder 26 and the recess 14 as well as the contact surface 12 lie coaxial to the central axis 22 of the hollow element 10. The further end face 30 of the hollow element is in this embodiment made flat and simply provided with a small countersink 32 which forms a clean transition to the thread 24.

The stepped jacket surface 34 of the hollow element merges via a small radius 36 into the end face 12 and this radius 36 is preferably made smaller than 0.5 mm, for example 0.3 mm.

In the disclosed embodiment, the contact surface 16 has eight recesses 38 which, as can be seen from FIG. 2, are made substantially wedge-shaped and have their greatest depth at the transition into the sidewall 15 of the recess 14. In plan view the recesses 38 are approximately rectangular as can be seen from FIG. 1. These recesses are generated by cold forming during the manufacture of the nut element and the corresponding deformation of the hollow element blank leads to bead-like projections 40 in the sidewall of the recess 14, with these projections leading, as can clearly be seen from the left side of FIG. 2, to local undercuts 41 in the sidewall of the recess 14.

As materials for the hollow elements, all materials can be used which in the context of cold forming achieve the strength values of class 8 in accordance with the ISO-standard, for example a 35 B2-alloy in accordance with DIN 1654. The so formed hollow elements or nut elements are suitable, amongst other things, for all commercially available steel materials for drawn quality sheet metal parts and also for aluminum or magnesium or their alloys. The nuts can also be formed in other materials, for example in aluminum alloy, in particular in an aluminum alloy of higher strength.

It will be understood that in FIG. 2, the formation of the nut element at the right hand side of the central axis 22 is identical to that on the left hand side.

The manner of attachment of the hollow element of FIGS. 1 and 2 in a plate-like component in the form of a sheet metal part 42 will be subsequently explained in more detail with reference to FIGS. 3 to 8.

Figure 3:
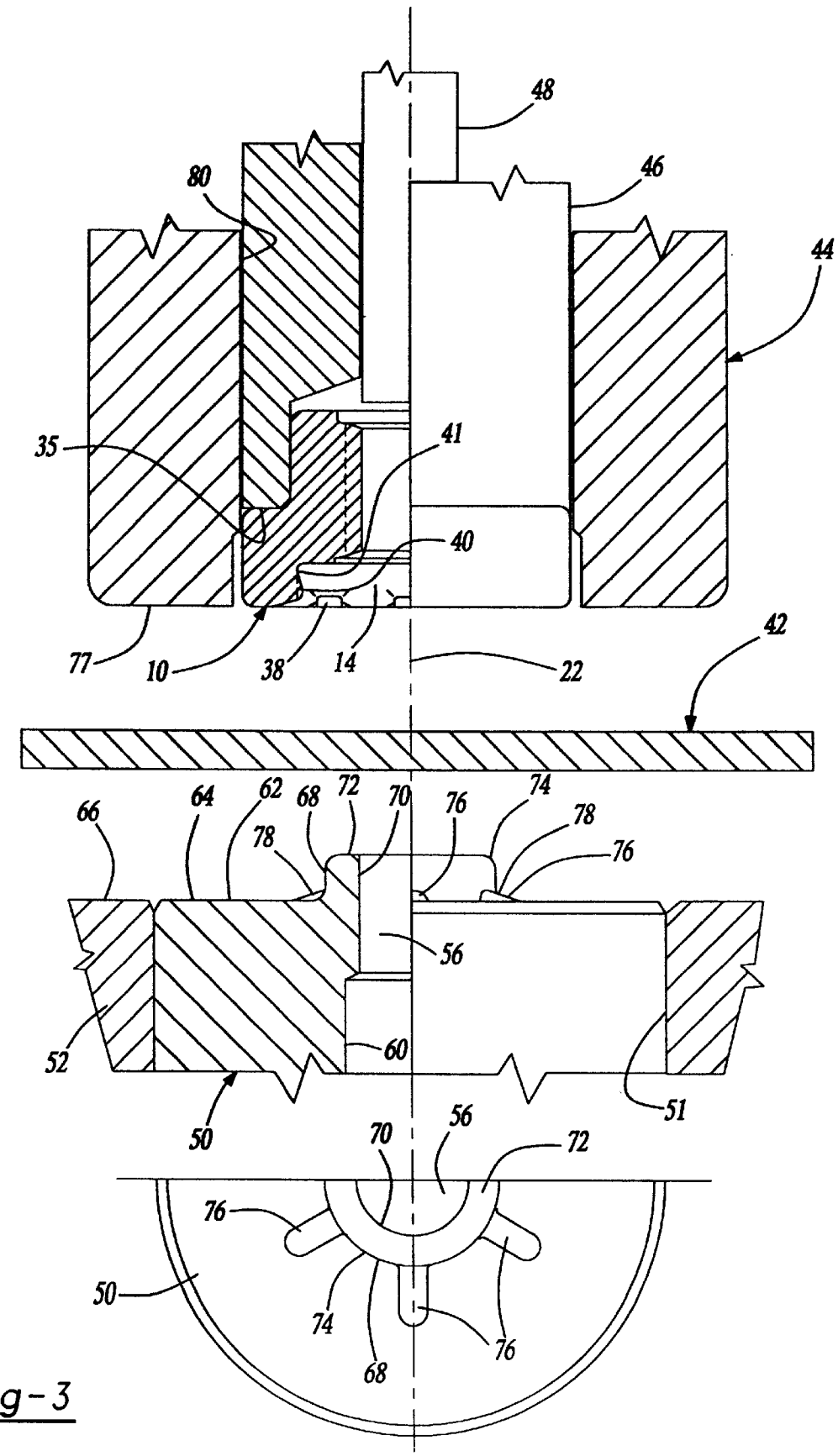

In FIG. 3 the hollow element 10 of the invention is shown in an only partly illustrated setting head 44 which has a plunger 46 and also a hole punch arranged coaxially to the plunger 46. A setting head of this kind is known per se in principle from the above-mentioned German specifications, i.e. DE-PS 34 46 978 and DE-OS 38 35 556.3.

Figure 7:
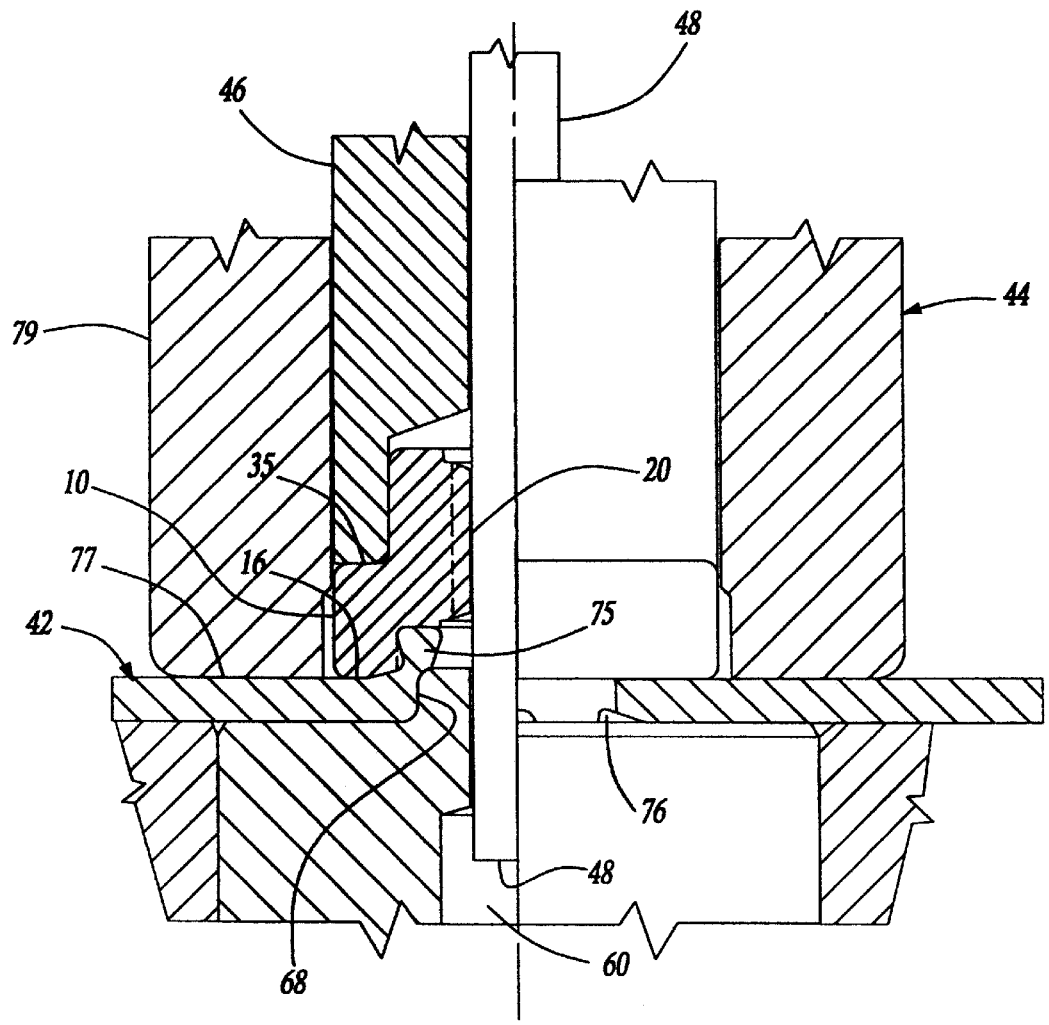
Figure 7A:
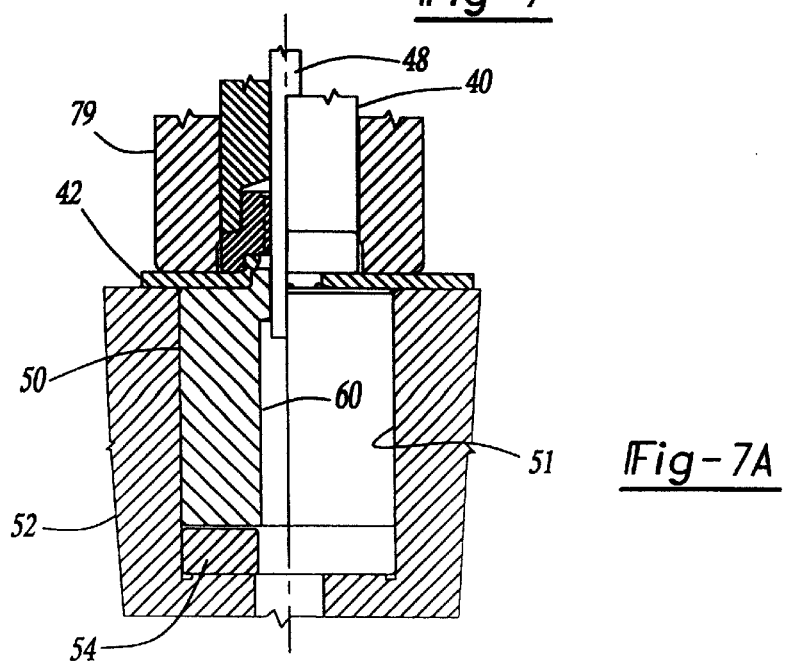

Beneath the sheet metal part 42 there is located a die button 50 which, as is for example illustrated in FIG. 7A, is inserted as a cylindrical component into a cylindrical bore 51 of a lower tool 52 of a press and is held at the correct height, flush with the surface of the lower tool 52 by means of a spacer 54. The die button 50 has a central bore 56 which merges via a ring shoulder 58 into a larger bore 60. The end face 62 of the die button 50 has a planar surface 64 which lies flush with the upper surface 66 of the lower tool 52. Furthermore the end face of the die button 50 has a hole-forming punch projection 68. The bore 56 which forms the aperture of the punch projection 68 has a cutting edge 70 with an inner diameter which corresponds to that of the bore of the hollow element. The end face 72 arranged coaxial to the longitudinal axis 22 and which stands at least substantially perpendicular to this axis has a rounded drawing edge 74 at the transition to the jacket surface of the hole-forming punch projection 68.

A plurality of noses 76 are arranged at intervals around the punch projection. In this example six such noses are provided which are uniformly arranged around the hole-forming punch projection 68. The noses 76 have an inclined surface 78 and are formed in raised manner both at the jacket surface of the hole-forming punch projection 68 and also at the planar end face 64 of the die button 50.

The noses 76, which are as a whole rounded at all surfaces are made somewhat narrower than the recesses 38 in the contact surface 16 of the nut element 10. Through the use of the same reference numeral 22 it is made clear that the hole punch 48, the plunger 46, the lower end face 77 of the setting head, the hollow element 10 and the die button 50 of the lower tool 52 and also the bore 56 and the bore 60 of the die button and ultimately also the through-bore of the spacer 54 are all coaxially arranged.

The setting head 44 itself is arranged in known manner at the upper tool of a press and is so designed, in the usual manner, that the respective nut elements 10 pass through an inclined channel into the bore 80 of the setting head 44 and are subsequently guided by means of the plunger 44 during closing of the press to the end face of the setting head.

Figure 4:
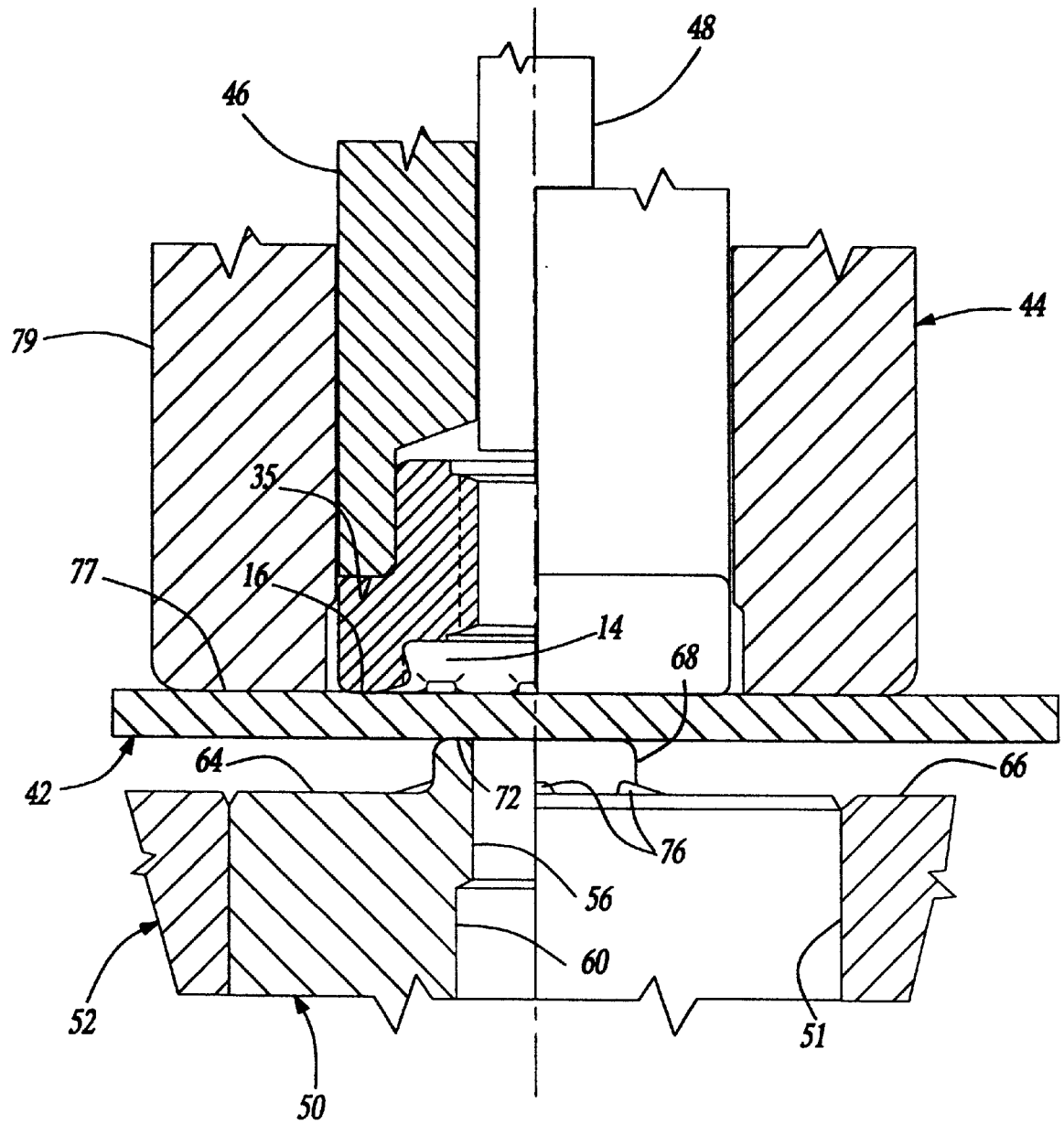
Figure 5:
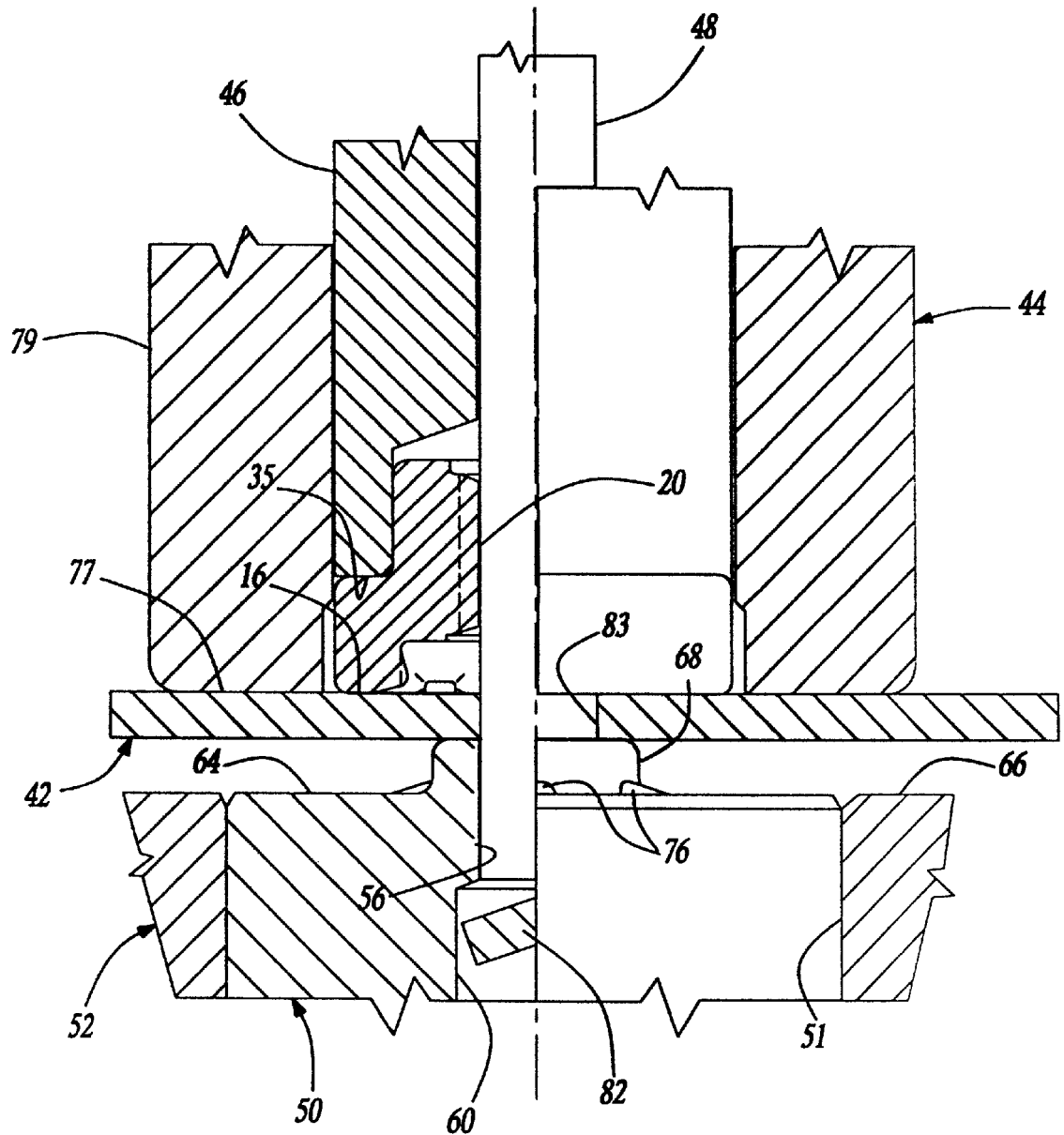

On closing of the press, for example for the shaping of the sheet metal part by the lower tool 52 in combination with an upper non-illustrated tool, the setting head moves from the position of FIG. 3 into the position of FIG. 4. The lower end face 77 of the setting head 44 comes into contact with the sheet metal part 42 in this way and the sheet metal part is in turn pressed against the end face 72 of the die button 50. A further downward movement of the housing 79 of the setting head is prevented at this stage, the housing 79 of the setting head deflects rearwardly somewhat relative to the downwardly moving tool of the press. This also applies to the plunger 46 which advantageously presses against the shoulder 35 of the hollow element and not against the end face 31, whereby the danger of damaging the thread 34 is effectively avoided. The upper tool of the press however drives the hole punch further downwardly initially into the position of FIG. 5. During this, the hole punch 48 cuts a slug 82 out of the sheet metal part 42 in cooperation with the cutting edge 70 of the hole-forming punch projection 68 of the die button 50, as shown in the sequential drawing of FIG. 5. In this manner a punched hole 83 is formed in the sheet metal part 42. One can see from this drawing that the hole punch 48 is slidingly received in the bore 56 of the die button 50 as well as in the bore 20 of the hollow element 10.

The slug 82 can be removed through the bore 60 of the die button 50 and the larger diameter of this bore 60 in comparison to the bore 56 ensures that the slug moves easily under gravity and does not become caught or stuck.

Figure 6:
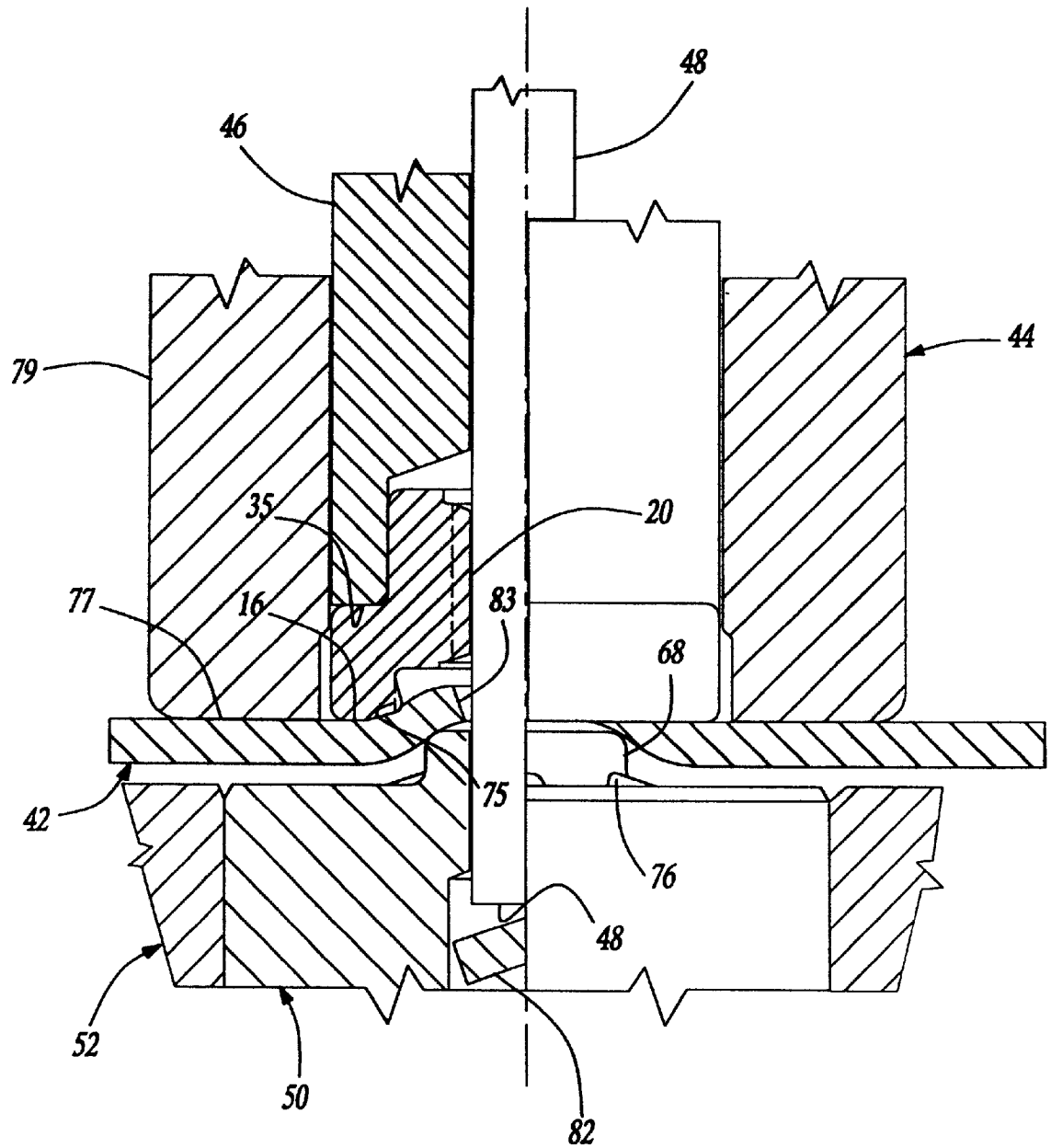

During the further closing movement of the press, the housing 79 of the setting head 44 and the plunger 46 are jointly moved further downwardly, as shown in FIG. 6, whereby the hole-forming punch projection 68 or, stated more precisely, the rounded drawing edge 74 of the hole-forming punch projection forms a collar 75 from the sheet metal material around the punched hole 83 while widening out the punched hole. This deformation continues up to the end stage as shown in FIG. 7 and one can see from FIG. 7 that the hole-forming punch projection 68 has so deformed the sheet metal material, or the collar 75, that this has been pressed in form-locked manner into the recess 14 of the hollow element and into the undercuts 40.

As a result of the different number of noses 46 in comparison to the number of recesses 38 in the contact surface 16 of the hollow element, it is ensured that at least one nose comes fully into alignment with a recess 38, and indeed without having to take any measures to secure the rotational position of the hollow element about the central axis 22. At least partial alignment with the noses of the die button can be expected for at least some of the other recesses 38, so that a form-locked contact also arises there, whereby the security against rotation is ensured.

Since the bead-like projections 40 which form the undercuts likewise lead to a corrugated surface of the sidewall of the recess 14 the form-fitted contact of the sheet metal part against this sidewall likewise provides a significant contribution to the rotational security of the connection.

Figure 8:
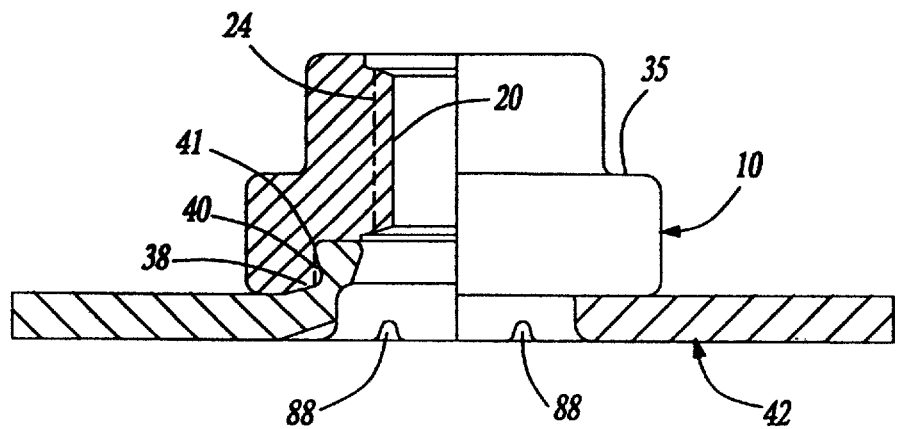

In the step illustrated in FIG. 7, the press opens again and the workpiece 42 together with the attached hollow element is ejected from the press or removed from the press and then presents itself as shown in FIG. 8. One can see from FIG. 8, that the inner diameter of the collar 75 of the sheet metal part 42 is somewhat larger than the outer diameter of the thread 24, so that the sheet metal part cannot prevent the insertion of a bolt. The bolt which fits into the thread 24 is normally introduced in the direction of the arrow 86 and customarily serves to secure a second sheet metal part to the sheet metal part 42. It can be seen clearly from FIG. 8 that a considerable contact surface is present so that the surface pressure can be readily kept within permissible limits dependent on the material, and indeed also with a hollow element of a comparatively small diameter. The recesses 88 which are generated by the noses 76 in the sheet metal part are also evident in FIG. 8.

Although the hollow elements shown here all have a circularly cylindrical jacket surface, i.e. a circular cross-section in plane view, other cross-sectional shapes, for example polygonal shapes or oval shapes or cross-sectional shapes having grooves can also be used. The expression "ring-like" will also be understood to mean not only circular rings but rather also ring shapes which differ somewhat from a circular ring shape, such as for example a polygon. The sidewall 41 of the recess 14 can also take the form of a polygon or multi-sided figure. Various variants of the invention can be conceived of which some will be explained in more detail with reference to the further FIGS. 9 to 12.

Figure 9:
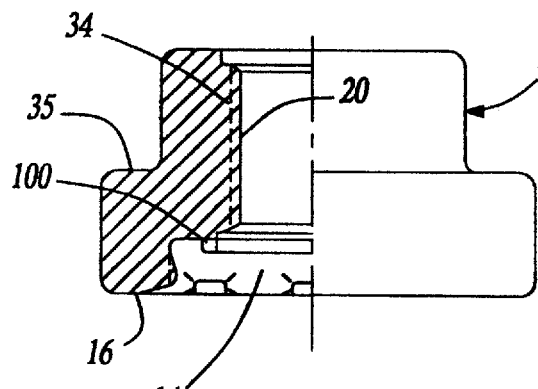

In the embodiment of FIG. 9, a projection 100 is located in the base region of the recess 14. This projection 100 is not to be regarded as a pilot portion since it merely enables the use of a shortened thread or of a reduction in the height of the hollow element but otherwise has no function. It would however be conceivable to provide this projection 100 with noses and/or recesses, with the deformation of the sheet metal part against the noses and/or recesses making it possible to achieve an additional security against rotation. A design of this kind with noses 102 and recesses 104 can be seen in FIG. 12 and here the undercut is not only present through the formation of local recesses such as 38 in FIG. 1 but rather in the form of a sidewall of the recess 14 which has been inclined all around its periphery whereby a conical recess 106 of the contact surface is generated. Since in the embodiment of FIG. 12 the recesses 38 which form a security against rotation are missing and the sidewall is an inclined wall, the noses 102, 104 represent the only security against rotation.

Figure 10:
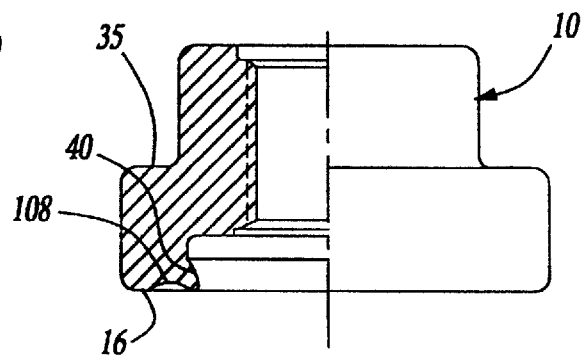
Figure 11:
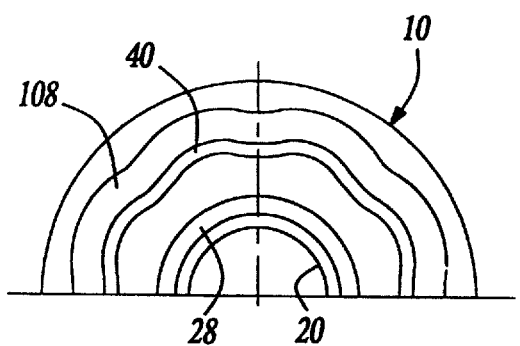
Figure 12:
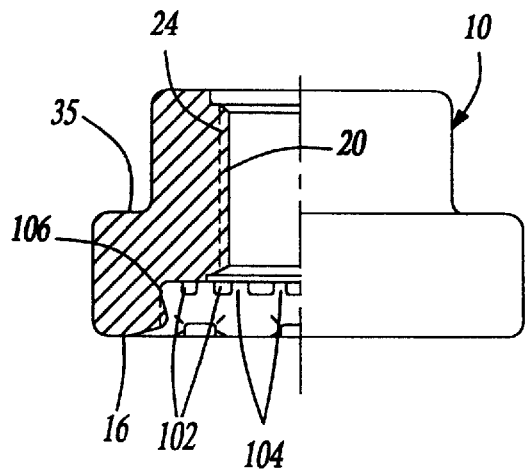

In the embodiment of FIG. 10, the contact surface 16 is provided with a recess 108 which for example has a semi-circular cross-section and is depressed at several circumferential locations in order to also form bead-like projections 40 here, as in the embodiment of FIG. 1. When using such a profiled contact surface the die button should have a corresponding profile so that the sheet metal lies flush with the whole contact surface. The recess 108 can also be so formed in the manner shown in FIG. 11, i.e. as a corrugated recess in plane view. When the die button has a form complementary to this, the required security against rotation is ensured by this recess.

This recess can also be so executed that the inner sidewall of the recess 14 receives projections 40 which also form undercuts which serve to generate the required push-out resistance and also offer an additional security against rotation.

An advantage of the hollow element of the invention lies in the fact that one hollow element can be used with sheet metal components of various thicknesses, for example metal sheets in the range from 0.75 mm to 2.25 mm. It is only necessary to use a matching die button with the hole-forming punch projection having to have a larger diameter for thinner metal sheets than for thicker metal sheets.

What is claimed is:

1. A fastener for installation in a part, said fastener including a body having a part contact face and at least one side, a bore extending through said part contact face and said body, a recess generally coaxially aligned with and surrounding said bore extending from said bore to a spaced distance from said side of said body, said part contact face extending from said recess to said side, said recess having an outer surface spaced from said side, and a groove in said part contact face generally encircling said recess outer surface and extending toward and away from said outer surface of said recess, spaced from said outer surface, said groove resisting rotation of said fastener when said fastener is attached to said part;

said outer surface of said recess includes a plurality of spaced projections adjacent said part contact surface extending into said recess and overlying a bottom wall of said recess adjacent portions of said groove which extend toward and away from said outer surface of said recess.

2. The fastener for installation in a part as defined in claim 1, wherein said groove in said part contact face is a continuous sinuous groove extending toward and away from said outer surface of said recess.

3. The fastener for installation in a part as defined in claim 1, wherein said projections are arcuate adjacent said part contact surface, each angled inwardly toward said bottom wall of said recess and restricting the opening of said recess.

4. A fastener for installation in a part, said fastener including a body having a part contact face and at least one side, a bore extending through said part contact face and said body, a recess generally coaxially aligned with and surrounding said bore extending from said bore to a spaced distance from said side of said body, said part contact surface extending from said recess to said side, and said recess having an outer surface spaced from said side, said part contact face including a plurality of spaced projections extending radially into said recess overlying a bottom wall of said recess and a sinuous groove generally surrounding said recess extending toward and away from said outer surface of said recess, spaced from said outer surface, said spaced projections and said groove resisting rotation of said fastener when attached to said part.

5. The fastener for installation in a part as defined in claim 4, wherein said spaced projections are arcuate and said sinuous groove is arcuate generally conforming to an inner surface of said part contacting face and generally equally spaced from said outer surface of said recess.

6. The fastener for installation in a part as defined in claim 4, wherein said spaced projections are angled inwardly from said part contact face toward said bottom wall of said recess.

7. A fastener and part assembly, comprising:

a part;

a fastener including a body having a part contact face and at least one side, a bore extending through said part contact face and said body, a recess generally coaxially aligned with and surrounding said bore extending from said bore to a spaced distance from said side of said body; said part contact face extending from said recess to said side, a plurality of spaced projections extending inwardly into said recess overlying a bottom wall of said recess and a groove in said part contact face generally encircling said outer surface of said recess and extending toward and away from said outer surface of said recess; and said fastener part contact face contacting a surface of said part with a portion of said part deformed into said recess about said projections preventing removal of said part from said fastener and another portion of said part deformed into said groove resisting rotation of said fastener on said part; said spaced projections are arcuate and said groove is sinusoidal including arcuate portions extending toward and away from said outer surface of said recess generally conforming to the arcuate surfaces of said projections.

8. The fastener and part assembly defined in claim 7, wherein said groove in said part contact face is a continuous sinuous groove in said part contact face completely encircling said outer surface of said recess and extending toward and away from said outer surface of said recess.

9. The fastener and part assembly defined in claim 7, wherein said sinuous groove is continuous having a generally semi-circular bottom wall generally equally spaced from the adjacent outer surface of said recess.

* * * * *